United States Patent [19]
Taricco

[11] Patent Number: 5,857,646
[45] Date of Patent: Jan. 12, 1999

[54] AIRCRAFT DE-ICING AND RECOVERY SYSTEM

[76] Inventor: Todd Taricco, P.O. Box 1547, Zephyr Cove, Nev. 89448

[21] Appl. No.: 634,954

[22] Filed: Apr. 19, 1996

Related U.S. Application Data

[63] Continuation of Ser. No. 243,774, May 16, 1994, abandoned.

[51] Int. Cl.$^6$ .................................................. B64D 15/00
[52] U.S. Cl. ................................ 244/134 R; 244/134 C; 15/215
[58] Field of Search ........................ 244/134 C, 134 R; 210/652; 15/215, 310; 219/549; 404/35

[56] References Cited

U.S. PATENT DOCUMENTS

| | | | |
|---|---|---|---|
| 3,165,773 | 1/1965 | Palpacelli | 15/310 |
| 3,242,034 | 3/1966 | Trager | 15/215 |
| 3,348,459 | 10/1967 | Harvey | 404/35 |
| 3,385,182 | 5/1968 | Harvey | 404/35 |
| 3,533,395 | 10/1970 | Yaste | 244/134 C |
| 4,414,113 | 11/1983 | La Terra | 210/652 |
| 4,967,057 | 10/1990 | Bayless et al. | 219/549 |
| 5,003,157 | 3/1991 | Hargrove | 219/549 |
| 5,060,887 | 10/1991 | Kean | 244/134 C |
| 5,354,014 | 10/1994 | Anderson | 244/134 R |

*Primary Examiner*—Andres Kashnikow
*Assistant Examiner*—Tien Dinh
*Attorney, Agent, or Firm*—Blakely Sokoloff Taylor & Zafman

[57] ABSTRACT

A system for collecting and recovering de-icing fluid that is sprayed onto an aircraft. The de-icing system includes a mat that is assembled onto the approaching ramp of a runway. The de-icing mat has a plurality of channels that collect and direct the de-icing fluid to the outer edges of the mat. The de-icing fluid is removed from the mat by a vacuum system. Coupled to the vacuum system is a filter system that separates the de-icing fluid from other fluids such as oil, water, etc., so that the de-icing fluid can be used again. The mat has a plurality of heating elements that prevent the de-icing fluid from freezing on the mat and provide heat to the underside of the aircraft.

6 Claims, 1 Drawing Sheet

AIRCRAFT DE-ICING AND RECOVERY SYSTEM

This is a Continuation Application of application Ser. No. 08/243,774, filed 05/16/94, now abandoned.

BACKGROUND OF THE INVENTION

1. FIELD OF THE INVENTION

The present invention relates to a system for collecting and recovering de-icing fluid that is sprayed onto an aircraft.

2. DESCRIPTION OF RELATED ART

The formation of ice on the wings of an airplane can reduce the lift and increase the drag by degrading the performance of the airfoil. Additionally, the ice may break away from the wing and be ingested by an engine, possibly causing a failure of the engine and endangering the safety of the passengers of the aircraft. To remove and prevent the build-up of ice on the wings, the skin of the wings can be sprayed with a fluid that has a low freezing point, such as a glycol. In cold climates the wings are typically sprayed at the airport before takeoff. The glycol forms a protective layer on the aircraft. The glycol has a low shear strength and allows the ice to be sheared from the wings.

Most of the glycol that is sprayed onto the wings falls off of the plane and flows into a drainage system which removes the de-icing fluid. An aircraft is typically sprayed with gallons of de-icing fluid that is used only one time. It would be desirable to provide a recovery system that can collect and recycle de-icing fluid sprayed onto an airplane so that the fluid can be reused. Recycling the de-icing fluid would decrease the cost of spraying the aircraft.

Glycol is generally considered a hazardous material that requires special handling and storage. For this reason, aircraft are typically sprayed with de-icing fluid at a remote location. Having to maneuver each airplane to the de-icing area requires valuable time which can disrupt airport scheduling. It would therefore be desirable to provide a portable de-icing fluid recovery system that can store hazardous material and be assembled at a location adjacent to the runway of an airport so that each aircraft can be readily sprayed with de-icing fluid.

SUMMARY OF THE INVENTION

The present invention is a system for collecting and recovering de-icing fluid that is sprayed onto an aircraft. The de-icing system includes a mat that is typically assembled at the taxiway of an airport. The de-icing mat has a plurality of channels that collect and direct the de-icing fluid to the outer edges of the mat. The de-icing fluid is removed from the mat by a vacuum system. Coupled to the vacuum system is a filter system that separates the de-icing fluid from other fluids such as oil, water, etc., so that the de-icing fluid can be used again. The mat has a plurality of heating elements that prevent the de-icing fluid from freezing on the mat and provide heat to the underside of the aircraft.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
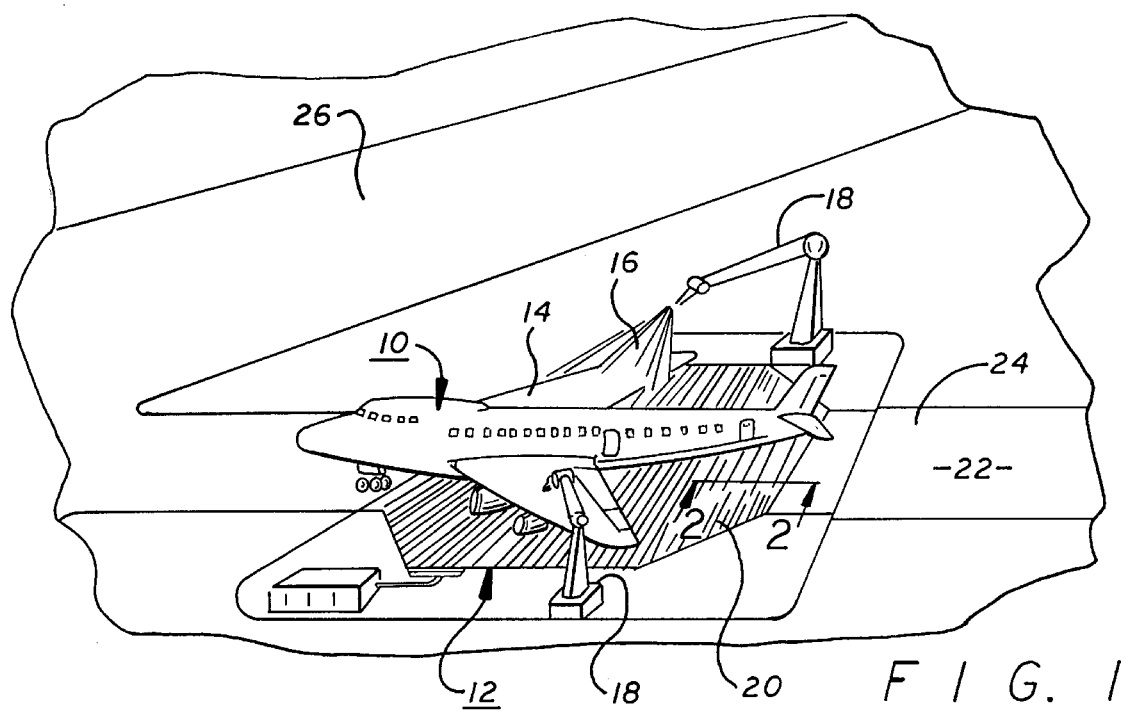
FIG. 1 is a perspective view showing an aircraft within a recovery system of the present invention.

Referring to the drawings more particularly by reference numbers, FIG. 1 shows an aircraft 10 located within a recovery system 12 of the present invention. To prevent the formation of ice on the wings 14 of the aircraft 10, the wings 14 are sprayed with a de-icing fluid 16 by a boom 18. There is typically one boom 18 for each wing 14. The booms 18 have pumps (not shown) and nozzles that can create a spray of de-icing fluid 16. The booms 18 may also have multiple degrees of freedom to allow the booms 18 to more accurately spray the wings of the aircraft 10. The de-icing fluid 16 is typically a glycol or other substance which has a freezing temperature significantly lower than the freezing temperature of water.

The recovery system 12 includes a mat 20 that extends across the top surface of an airport surface 22. In the preferred embodiment, the mat 20 is assembled from a plurality of individual pieces that are linked together. The individual pieces may have features that allow the pieces to be interlocked. The individual pieces allow the mat 20 be readily assembled and disassembled from any location of an airport. In the preferred embodiment, the mat 20 is assembled at the taxiway 24 of a runway 26. Placing the recovery system 12 at the taxiway 24 allows the de-icing fluid 16 to be sprayed onto the aircraft as the vehicle taxis onto the runway 26. Spraying the aircraft 10 at the taxiway 24 reduces the amount of time required to de-ice the wings 14 of the plane. The mat 20 can be constructed from a high strength polyurethane composite or other similar material that can withstand the weight of the airplane. Alternatively, the mat 20 could be constructed from a low cost rubber material.

Figure 2:
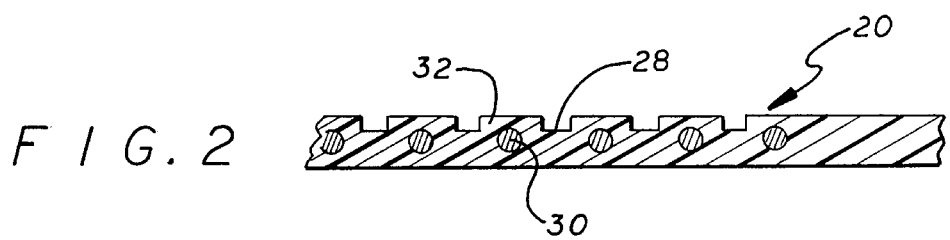
FIG. 2 is a cross-sectional view of a mat of the recovery system; token at line 2—2 of FIG. 1.

As shown in FIG. 2, the mat 20 has a plurality of channels 28 that collect the de-icing fluid 16 that falls off of the airplane. Alternatively, the channels 28 may be replaced by perforated tubes, or the mat 20 may be constructed from a porous material with the tube integrated therein. The mat 20 may have a plurality of wires 30 that extend through ridge portions 32 that separate the channels 28. The wires 30 are connected to a power supply (not shown) that provides a current which generates heat within the mat 20. The heat created by the wires 30 prevent freezing of the de-icing fluid 16 and insure that the fluid 16 flows across the mat 20. The energized wires 30 can also provide heat to the underside of the aircraft to further melt any ice formed on the vehicle. The individual mat pieces can be constructed so that the wires 30 have a butt joint connection. Alternatively, the wires 30 may have connectors to join wires of adjacent mat pieces. As an alternate embodiment, the wires 30 may be replaced by channels that receive a heated fluid. As another alternative, the recovered glycol may be heated and pumped back through the channels 28, wherein the water collected with the glycol is distilled off of the mat 20. Additionally, the heat of the distilled water will heat the aircraft.

Figure 3:
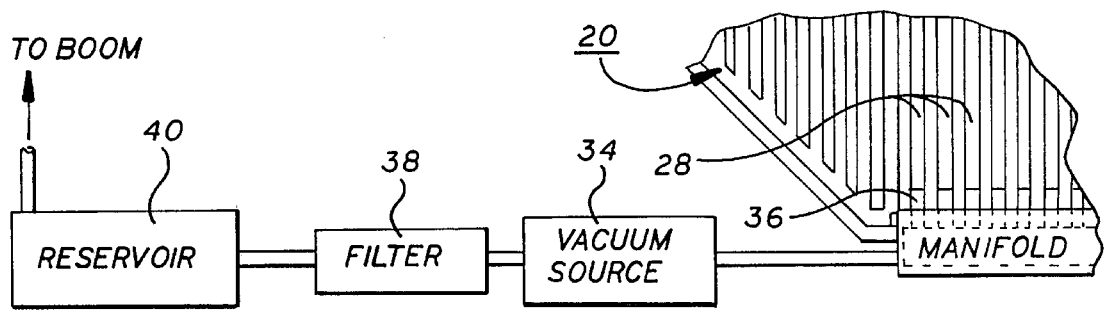
FIG. 3 is a schematic view of a vacuum pump and separating filter of the recovery system.

As shown in FIG. 3, the recovery system 12 has a vacuum pump 34 that removes the de-icing fluid 16 from the mat 20. The vacuum pump 34 is coupled to the mat 20 by a plurality of tubes 36 that are located within the channels 28. The mat 20 may have a slope that causes the fluid 16 to flow to the outer edges of the mat 20 for removal by the vacuum pump 34. The slope can be created by varying the thickness of the mat 20, or placing an additional layer under the mat 20.

Coupled to the vacuum pump 34 is a filter system 38 which filters and separates the de-icing fluid 16 from other fluids and materials that are collected and recovered from the mat 20. The filter system 38 may include a reverse osmosis membrane to filter the glycol. By way of example, the filter system 38 may contain a separator that separates the de-icing fluid 16 from oil that is collected by the system. The filtered de-icing fluid 16 is stored within a reservoir 40 for subsequent reuse. The system 12 may also have a distiller (not shown) which separates the glycol from any water recovered from the mat 20.

In operation, the mat 20 is assembled onto the taxiway 24 by connecting the various individual pieces of the mat 20. The wires 30 are then connected to the power supply and the vacuum pump 34 and filter system 38 are assembled and coupled to the mat 20 by the tubes 36 which are placed within the channels 28. Before takeoff, the aircraft 10 will be driven onto the mat 20, where the wings 14 are sprayed with de-icing fluid 16. The fluid 16 is collected by the mat 20, removed from the mat 20 by the vacuum pump 34 and filtered by the filter system 38 for storage in the reservoir 40 where the recovered fluid 16 can be reused by the booms 18. When de-icing is no longer required, the recovery system 12 can be removed by disassembling the various components and storing the same. The present invention thus provides a system that recovers de-icing fluid 16 and reduces the cost for operating a de-icing system. Additionally, the present invention provides a system for handling and storing hazardous de-icing fluids and allows the aircraft to be de-iced at the taxiway of an airport.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for de-icing an aircraft located on a top surface of a runway, comprising the steps of:

a) connecting a plurality of mat segments to construct a mat on the top surface of the runway, said mat having a plurality of channels;

b) connecting a pump assembly to said mat;

c) moving an aircraft onto said mat;

d) spraying the aircraft with a de-icing fluid which falls onto said mat and is collected in said channels; and, e) removing the de-icing fluid from said mat with said pump assembly.

2. The method as recited in claim 1, further comprising the steps of moving the aircraft off of said mat, disconnecting said mat and removing said mat segments from the top surface of the runway.

3. The method as recited in claim 1, further comprising the step of connecting a heating assembly to said mat to heat the de-icing fluid on said mat.

4. The method as recited in claim 1, further comprising the steps of filtering the removed de-icing fluid and spraying the filtered de-icing fluid onto the aircraft.

5. A method for de-icing an aircraft located on a runway, comprising the steps of:

a) connecting a plurality of mat segments to construct a mat on the runway, said mat having a plurality of channels;

b) connecting a pump assembly to said mat;

c) connecting a heating assembly to said mat to heat said mat;

c) moving an aircraft onto said mat;

d) spraying the aircraft with a de-icing fluid which falls onto said mat and is collected in said channels;

e) removing the de-icing fluid from said mat with said pump assembly;

f) filtering the removed de-icing fluid; and, g) spraying the filtered de-icing fluid onto the aircraft.

6. The method as recited in claim 5, further comprising the steps of moving the aircraft off of said mat, disconnecting said mat and removing said mat segments from the runway.

\* \* \* \* \*